ROBERT RENZ.

Shears.

No. 124,975. Patented March 26, 1872.

Witnesses:
Richard B. Lyon.
R. Fitzgerald.

Robert Renz,

UNITED STATES PATENT OFFICE.

ROBERT RENZ, OF NAUGATUCK, CONNECTICUT.

IMPROVEMENT IN SHEARS.

Specification forming part of Letters Patent No. 124,975, dated March 26, 1872.

*To all whom it may concern:*

Be it known that I, ROBERT RENZ, of the town of Naugatuck, in the county of New Haven and State of Connecticut, have invented a new and useful Improvement in the Manufacture of Shears and Scissors; and I do hereby declare that the following is a full, clear, and exact description of the construction, character, and operation of the same, reference being had to the accompanying drawing which makes part of this specification, in which—

Figure 1:
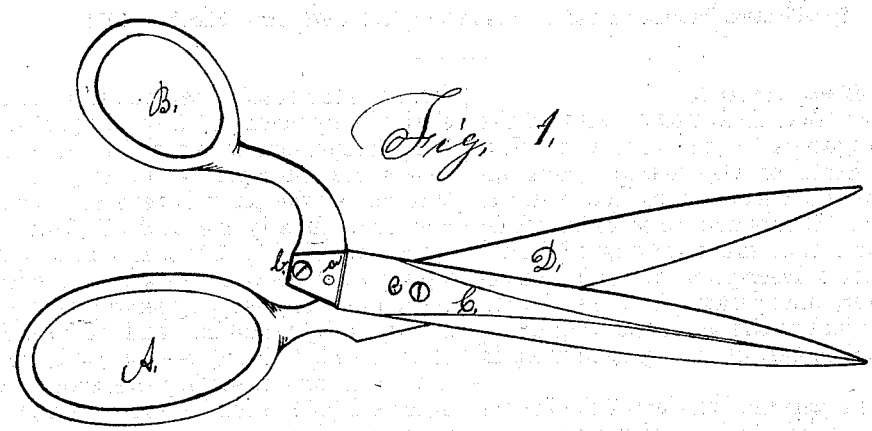
Figure 2:
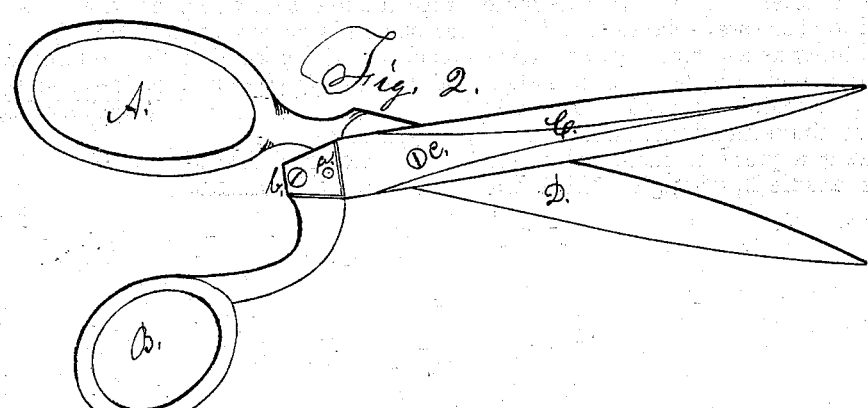

Figure 1 is a perspective view of the shears or scissors in the original or ordinary position for cutting. Fig. 2 is a perspective view of the blade as reversed, so as to cut with the opposite edges.

My improvement consists in making the shears or scissors with double cutting-blades, so that by removing the screw which attaches the smaller part of the handle to one of the blades, and simply by reversing their positions, I can cut with the opposite edges of the two blades, thus affording two pairs of cutting-edges in one pair of shears or scissors.

I make the handles A and B of malleable cast-iron, and weld the steel-blades C and D to them, substantially as described in the patent of Robert Renz and Andrew Renz, issued July 11, 1871. I make the blades C and D of cast-steel, as above mentioned, and with or without welding a piece of cast-steel to the shank of the handle B, (though I think the former is the best.) I secure the blade C to the shank B by means of a steady-pin or projection, as represented at $a$, and a set-screw, $b$, as represented in Figs. 1 and 2, so that I can, by turning out the screw $b$, reverse the handle B, and consequently the blade C, from what is represented in Fig. 1 to that in Fig. 2, and vice versa; thus showing shears and scissors of the double capacity, by simply changing the screw, or by removing and re-inserting the screw $b$, Figs. 1 and 2—that is, by reversing the blade and inserting the screw from the other side of the handle, the shears or scissors may be made to operate on the opposite edges, as represented in Fig. 1, so that I have double cutting-edges, because the blade C is changed to the opposite side or edge of the blade D. The two blades C and D I secure together by a common fulcrum or binding-screw, as represented at $a$, Figs. 1 and 2, so that the shears or scissors may operate in both ways, either right or left, as may be desired at any time.

What I claim as my invention, and desire to secure by Letters Patent, is—

The combination of the reversible handle B with the blade C, when the whole instrument or shears is constructed, fitted for the reversion, and to operate in the double capacity, substantially as herein described and set forth.

ROBERT RENZ.

Witnesses:
RICHD. F. LYON,
R. FITZGERALD.